United States Patent
Feng et al.

(10) Patent No.: US 11,057,465 B2
(45) Date of Patent: Jul. 6, 2021

(54) TIME-BASED DATA PLACEMENT IN A DISTRIBUTED STORAGE SYSTEM

(71) Applicant: International Business Machines Corporation, Armonk, NY (US)

(72) Inventors: Kuan Feng, Thornhill (CA); Hao Chen Gui, Shanghai (CN); Sheng Xu, Shanghai (CN); Jun Wei Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 14/959,021

(22) Filed: Dec. 4, 2015

(65) Prior Publication Data
US 2016/0173620 A1 Jun. 16, 2016

(30) Foreign Application Priority Data
Dec. 11, 2014 (CN) .......................... 201410759422.7

(51) Int. Cl.
*G06F 15/16* (2006.01)
*H04L 29/08* (2006.01)

(52) U.S. Cl.
CPC ................ *H04L 67/1097* (2013.01)

(58) Field of Classification Search
CPC .................................................. H04L 67/1097
See application file for complete search history.

(56) References Cited

U.S. PATENT DOCUMENTS

| 7,428,622 B2 | 9/2008 | Tulyani |
| 8,127,076 B2 | 2/2012 | Galloway et al. |
| 8,141,095 B2 | 3/2012 | Kumano et al. |

(Continued)

FOREIGN PATENT DOCUMENTS

| CN | 101370030 A | 2/2009 |
| CN | 102099792 A | 6/2011 |
| CN | 102129442 A | 7/2011 |

OTHER PUBLICATIONS

Shen et al., "MS-I/O: A Distributed Multi-Storage I/O System", Proceedings of the 2nd IEEE/ACM International Symposium on Cluster Computing and the Grid, May 21-24, 2002, pp. 1-10, © 2002 IEEE DOI: 10.1109/CCGRID.2002.1017124.

(Continued)

*Primary Examiner* — Suraj M Joshi
*Assistant Examiner* — Jarens Means
(74) *Attorney, Agent, or Firm* — Nolan M. Lawrence

(57) ABSTRACT

A distributed storage system places data in a time-based manner. The distributed storage system comprises a plurality of storage nodes for storing user data, and each user in at least one user is assigned a storage node sub-set for storing user data thereof. The distributed storage system monitors and records user accesses on storage nodes. The distributed storage system calculates a time-based access pattern of a user and time-based access patterns of the storage nodes outside the storage node sub-set of the user in the distributed storage system according to recorded user accesses. The distributed storage system adjusts the storage node sub-set of the user according to the time-based access pattern of the user and the time-based access patterns of the storage nodes outside the storage node sub-set of the user in the distributed storage system.

20 Claims, 6 Drawing Sheets

(56) References Cited

U.S. PATENT DOCUMENTS

| | | | |
|---|---|---|---|
| 8,539,163 B1* | 9/2013 | Sivasubramanian | G06F 9/38 |
| | | | 711/137 |
| 9,020,984 B1* | 4/2015 | Sorenson, III | G06F 3/0689 |
| | | | 707/809 |
| 9,128,965 B1* | 9/2015 | Yanacek | G06F 16/2282 |
| 2011/0010514 A1* | 1/2011 | Benhase | G06F 3/061 |
| | | | 711/162 |
| 2011/0320546 A1* | 12/2011 | Holden | H04L 65/403 |
| | | | 709/206 |
| 2013/0041875 A1 | 2/2013 | Kan et al. | |
| 2013/0159637 A1* | 6/2013 | Forgette | G06F 3/0631 |
| | | | 711/154 |
| 2014/0136571 A1 | 5/2014 | Bonvin et al. | |
| 2014/0173035 A1 | 6/2014 | Kan et al. | |
| 2016/0004571 A1* | 1/2016 | Smith | G06F 16/278 |
| | | | 718/105 |

OTHER PUBLICATIONS

CN Application 201410759422.7, Entitled "Method and apparatus for time-based data placement in a distributed storage system", Filed Dec. 11, 2014, 30 pages.

Unknown, "Design and Implementation of Mass Storage System for Multi-tenant SaaS Application", Issue 2, vol. 1, 2011, 5 pages, Abstract Only.

* cited by examiner

TIME-BASED DATA PLACEMENT IN A DISTRIBUTED STORAGE SYSTEM

BACKGROUND

The present disclosure relates to the field of computer, particularly, to a distributed storage system, and more particularly, to a method and apparatus for time-based data placement in a distributed storage system.

The scale-out or distributed storage system is an emerging storage technology for mass data storage in the modern time of data explosion. In some situations, a distributed storage system has the following characteristics: it is based on commodity hardware; it uses per node internal disks rather than an external disk array; it may be scaled out horizontally to huge capacity, e.g., tens, hundreds, or thousands of nodes, across geographies; it has rich role-based access control integrated with the storage system. The common data placement method in a distributed storage system uses a hash or similar algorithm to map specific features of data to storage addresses so as to distribute data on the storage nodes of the entire system. Examples of distributed storage systems are OpenStack/Swift, Hadoop Distributed File System (HDFS), General Parallel File System (GPFS), Ceph, etc.

SUMMARY

In an aspect of the present disclosure, there is provided a method and computer program product for time-based data placement in a distributed storage system. The distributed storage system includes a plurality of storage.

In another aspect of the present disclosure, there is provided an apparatus for time-based data placement in a distributed storage system. The distributed storage system includes a plurality of storage nodes for storing user data. Each user in at least one user is assigned a storage node sub-set for storing user data thereof. A monitoring module is configured to monitor and record user accesses on the storage nodes. A user access pattern calculating module is configured to calculate a time-based access pattern of a user according to recorded user accesses. A storage node access pattern calculating module is configured to calculate time-based access patterns of the storage nodes outside the storage node sub-set of the user in the distributed storage system according to recorded user accesses. A storage node sub-set adjusting module configured to adjust the storage node sub-set of the user according to the time-based access pattern of the user and the time-based access patterns of the storage nodes outside the storage node sub-set of the user in the distributed storage system, to alleviate input/output hotspots.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Through the more detailed description of some embodiments of the present disclosure in the accompanying drawings, the above and other objects, features and advantages of the present disclosure will become more apparent, wherein the same reference generally refers to the same components in the embodiments of the present disclosure.

Figure 1:
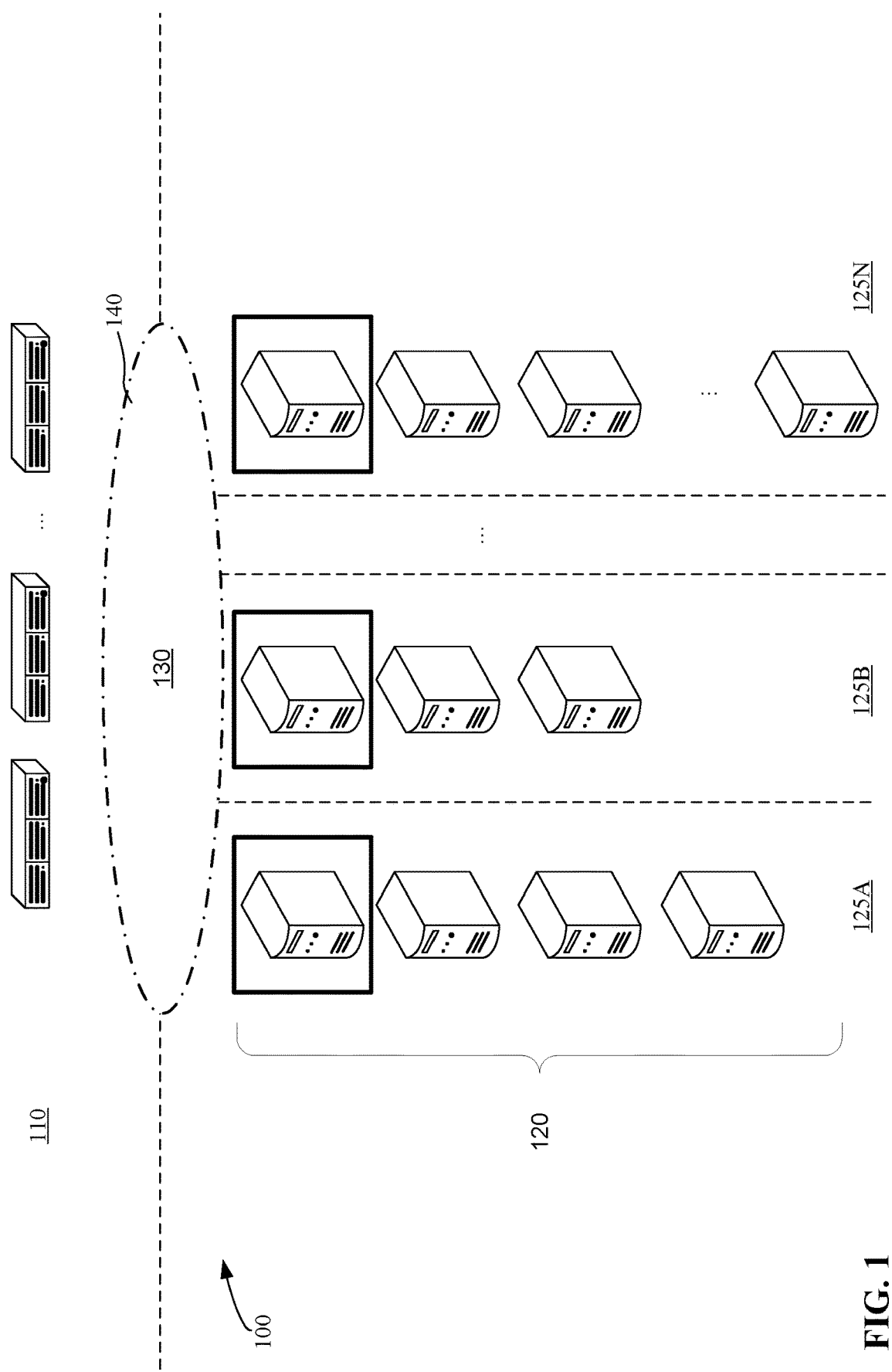
FIG. 1 shows a distributed storage system in which an apparatus for time-based data placement in a distributed storage system may be implemented according to an embodiment of the present disclosure by taking Swift as an example.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relates to the field of computer, particularly, to a distributed storage system, and more particularly, to time-based data placement in a distributed storage system. While the present disclosure is not necessarily limited to such applications, various aspects of the disclosure may be appreciated through a discussion of various examples using this context.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

In some situations, big data analytics combined with the distributed storage system pushes computation to data/storage nodes, wherein the computer infrastructure and the storage system are co-existed for the first round of processing; data are evenly stored in the system and are read in bursts, and data access has time patterns.

Such common data placement method does not consider the potential use of data, does not consider various data access requirements, and cannot efficiently balance I/Os, so when the system usage is high, this may lead to I/O hotspots. Although some attempts are made to solve the problem by placing data based on the resource statuses of the storage nodes, this method generally is not intelligent enough to reflect the resource usage on the time axis, and thus cannot effectively use all the I/O bandwidth.

Another problem of such a data placement method is to use the entire storage system, and cannot ensure a certain level of data aggregation, so data are too discrete, especially in case of starting new data sets on an existing huge system. In such a case, the cost for the analysis system to distribute computing binaries on all the storage nodes exceeds the benefits that can be gained.

Now referring to FIG. 1, it shows a distributed storage system in which an apparatus for time-based data placement in a distributed storage system is implemented according to an embodiment of the present disclosure by taking Swift as an example. As shown in FIG. 1, the storage access system 100 comprises a proxy layer 110, a number of storage nodes 120 and a private network 130 connecting the two. The proxy layer 110 faces the outside world. The proxy layer 110 is for verifying I/O access requests, authentication, and using a ring 140 to forward them to suitable storage nodes 120. The ring 140 is a data array, and it maps a request to a partition in the storage nodes 120 based on the uniform resource identifier of the request. The storage nodes 120 store, provide and manage data and metadata partitioned based on the ring 140. The storage nodes 120 may be divided into zones 125A, 125B, and . . . 125N (collectively 125). As known by those skilled in the art, the above is merely an example of a distributed storage system in which the apparatus of the present disclosure may be implemented, and the apparatus of the present disclosure may also be implemented in a distributed storage system with any other structures.

In one distributed storage system, the user data of each user (human user or application) is distributed across all the storage nodes 120 of the entire system, lacking appropriate data aggregation. Embodiments of the present disclosure can divide the huge distributed storage system into smaller sub-systems for each user (storage node sub-sets). In this way, data may be appropriately aggregated for a computation purpose. The method for defining the sub-systems may follow the original criterion of the system, and thus the availability and performance advantages of parallel accesses may be kept. For example, in FIG. 1, the storage node sub-set of a user is shown in blocks. It should be noted that the storage node sub-sets of different users may overlap or partially overlap, e.g., one storage node may be for a plurality of users.

Figure 2:
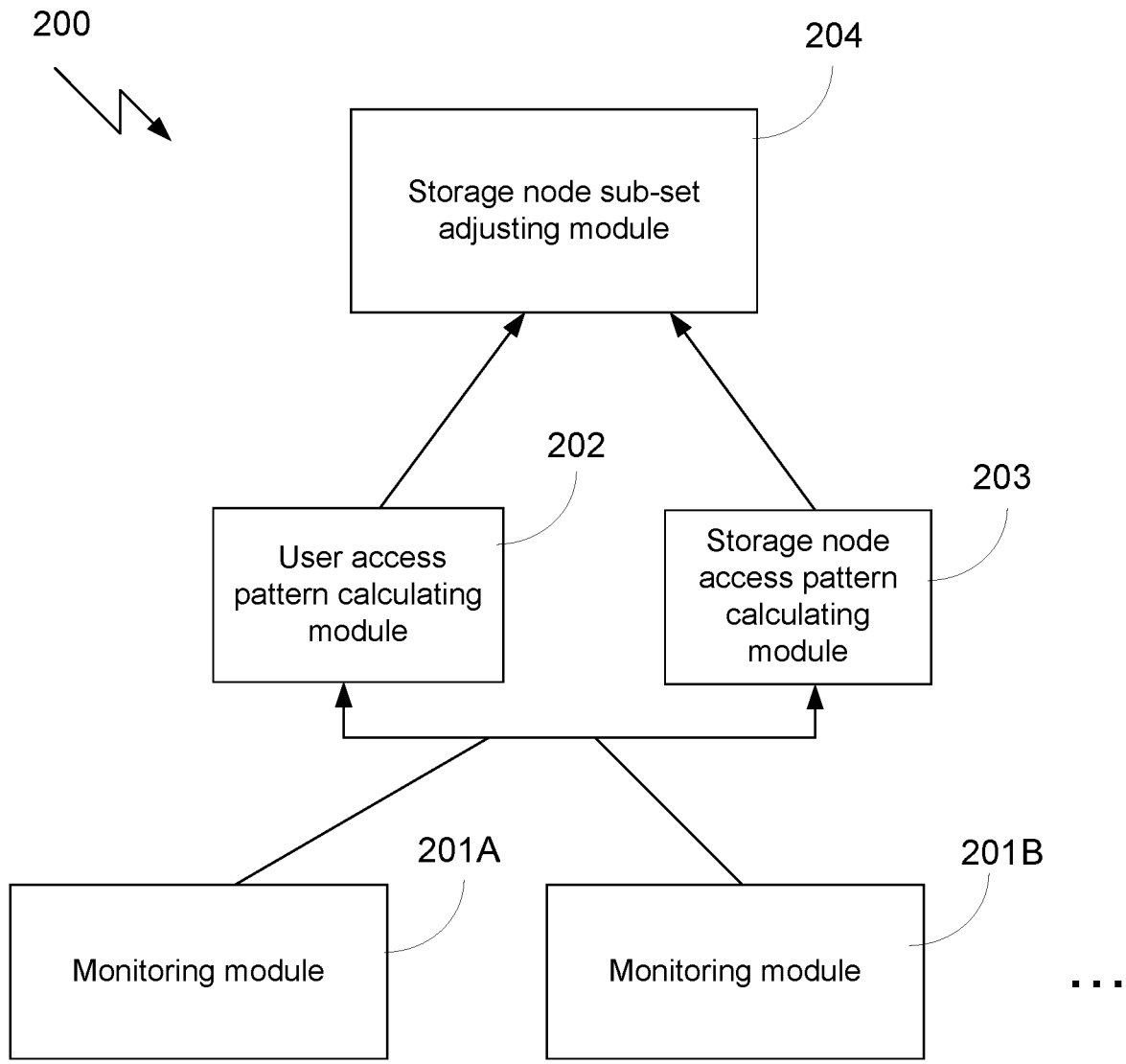
FIG. 2 shows an apparatus for time-based data placement in a distributed storage system according to an embodiment of the present disclosure.

Now referring to FIG. 2, it shows an apparatus 200 for time-based data placement in a distributed storage system according to an embodiment of the present disclosure. The distributed storage system may comprise a plurality of storage nodes for storing user data, and each user in at least one user may be assigned a storage node sub-set for storing the user data thereof. As shown, apparatus 200 comprises: at least one monitoring module 201A, 201B, etc. (collectively 201), a user access pattern calculating module 202, a storage node access pattern calculating module 203, and a storage node sub-set adjusting module 204.

The monitoring module 201 may be configured to monitor and record user accesses on the storage nodes. The monitoring module 201 may be on each storage node of the distributed storage system, and monitor and record accesses to the storage node by all users. Specifically, the monitoring module 201 may monitor and record the number of accesses to the storage node by each user in each unit time (e.g., each hour of each day of each month) in a time period (e.g., one year). For example, it may be recorded that user 1-250 accesses, 10:00 to 11:00, 1$^{st}$ July. In this way, the monitoring module 201 may record the number of accesses to the storage node by each user in a data structure, e.g., a three-dimensional array of 12(months)×31(days)×24 (hours), each element of which is the number of accesses to the storage node by the user in the corresponding hour. The data structure may be referred to as an Access Time Pattern (ATP) unit. The monitoring module 201 may record the ATP unit of each user on each storage node on the storage node, and may send it to the user access pattern calculating module 202 and the storage node access pattern calculating module 203.

In some embodiments, the user access pattern calculating module 202 is configured to calculate a time-based access pattern of a user according to recorded user accesses. The user access pattern calculating module 202 may be at a central location connected with the storage nodes, e.g., on a proxy node or management node of the distributed storage system.

Specifically, the user access pattern calculating module 202 may receive the ATP units of each user from the respective storage nodes, and for each user, add the ATP units from the respective storage nodes, e.g., adding the numbers of accesses in corresponding unit times of the respective ATP units to get a user ATP of the user, which reflects the total number of accesses to the storage node sub-sets in each unit time in a time period by a user. The user ATP of the user may form a user profile of the user together with the list of storage nodes in the storage node sub-set assigned to the user. The user profile may be created when the user is added to the distributed storage system, updated when the user ATP of the user is created or updated, and deleted when the user is removed from the distributed storage system. The user profile may be implemented using an existing mechanism of the distributed storage system. For example, for OpenStack/Swift, it can be implemented using a storage policy; for HDFS, it can be implemented using a NameNode federation.

The storage node access pattern calculating module 203 may be configured to calculate time-based access patterns of the storage nodes outside the storage node sub-set of the user in the distributed storage system according to recorded user accesses (e.g., time-based access patterns of the accesses to the storage node by all the users having data in the storage node). The storage node access pattern calculating module 203 may be on each storage node, and may be further incorporated into the monitoring module 201; or the storage node access pattern calculating module 203 may also be at a central location connected with the storage nodes, e.g., on a proxy node or management node of the distributed storage system.

Specifically, the storage node access pattern calculating module 203 may add up the ATP units of all the users on a storage node, e.g., adding the numbers of accesses in the corresponding unit times of the ATP units of the respective users respectively, to get the storage node ATP of the storage node, which reflects the total number of accesses by the users in each unit time in a time period on the storage node. The storage node ATP of a storage node may form a storage node profile of the storage node together with the list of all the users having data on the storage node. The storage node profile may be created when the node is added to the distributed storage system, updated when a user is added to or removed from the node or when the storage node ATP is updated, and deleted when the node is removed from the distributed storage system. The storage node profile may be a new data structure added to each storage node.

Figure 3:
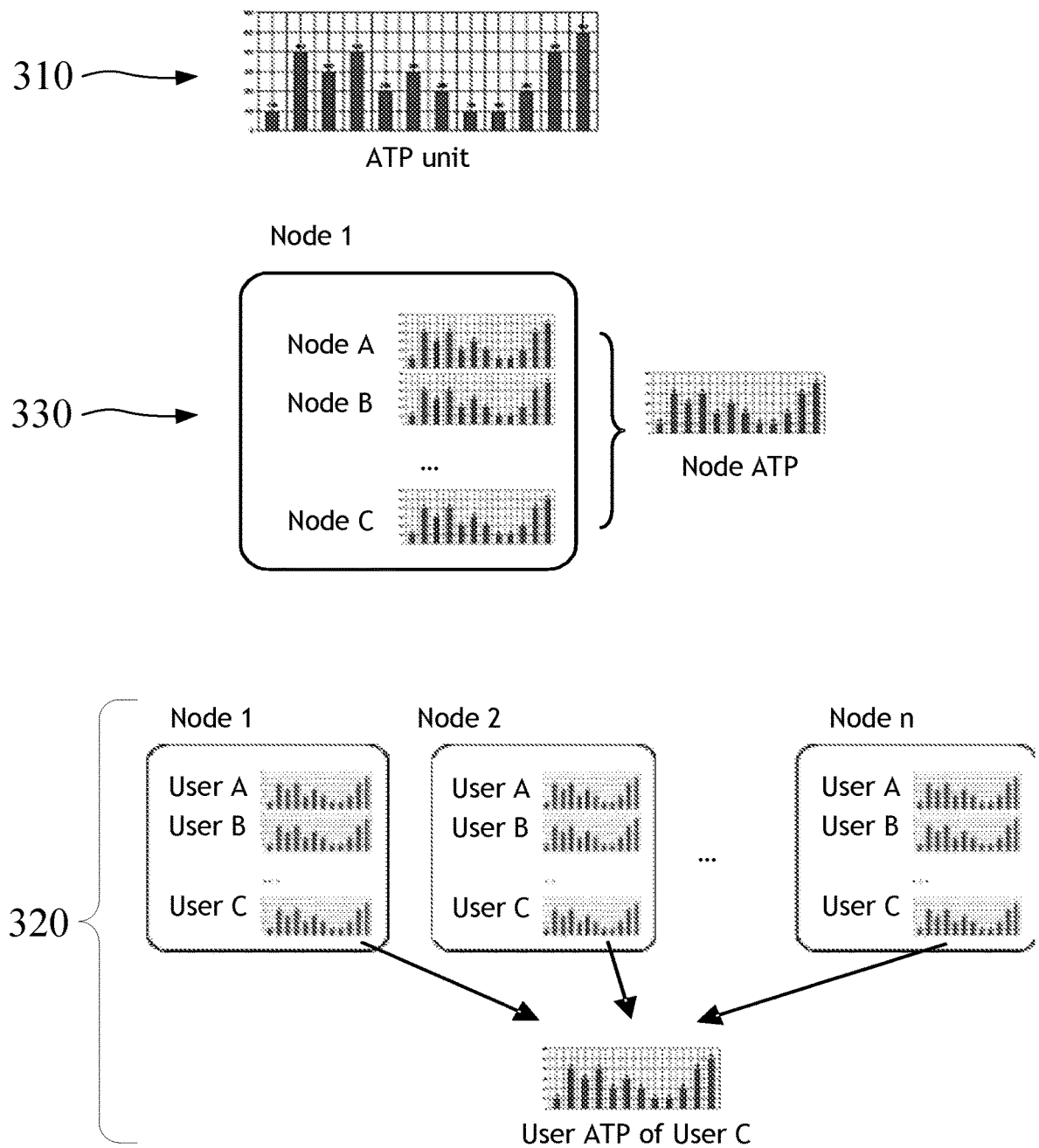
FIG. 3 shows a schematic diagram of forming user Access Time Patterns (ATPs) and storage node ATPs by ATP units according to an embodiment of the present disclosure.

FIG. 3 shows a schematic diagram of forming user ATPs and storage node ATPs from ATP units according to an embodiment of the present disclosure. As shown, an ATP unit 310 records the number of accesses in each unit time (e.g., a day) in a time period (e.g., a year) on a storage node by a user. For user C, adding all the ATP units on the nodes, node 1 to node n (e.g., adding the number of accesses within the corresponding unit times of each ATP unit) can get the user ATP of user C 320. And for storage node node 1, adding the ATP units of all the users thereon can get the node ATP of node 1 330.

Now returning to FIG. 1, the storage node sub-set adjusting module 204 may be configured to adjust the storage node sub-set of the user according to the time-based access pattern of the user and the time-based access patterns of the storage nodes outside the storage node sub-set of the user in the distributed storage system, to alleviate I/O hotspots. The storage node sub-set adjusting module 204 may use an existing mechanism of the distributed storage system to add a number of new storage nodes to the storage node sub-set of the user, so as to adjust the storage node sub-set of the user. The storage node sub-set adjusting module 204 may be on a proxy node or management node of the distributed storage system.

According to an embodiment of the present disclosure, the monitoring module 201 is further configured to monitor whether the user data of users on a storage node reaches a predetermined user usage threshold; and wherein the storage node sub-set adjusting module 204 is further configured to, in response to monitoring that the user data of a user on the storage node reaches the predetermined user usage threshold, adjust the storage node sub-set of the user. The predetermined user usage threshold may be set by the apparatus of the present disclosure by default, or be pre-specified by the user of the apparatus of the present disclosure, for limiting the amount of user data stored on the storage node by each user of the distributed storage system or the proportion of the amount of user data in the storage space. For example, it may be specified that the user usage threshold is 20 G or 10%, so that when the monitoring module 201 monitors that the user data of a user on the storage node reaches 10 G or 10% of the storage space, the monitoring module 201 may send an adjusting request to the storage node sub-set adjusting module 204, to trigger the storage node sub-set adjusting module 204 to adjust the storage node sub-set of the user, e.g., adding a number of storage nodes to the storage node sub-set of the user, so as to expand user's storage node sub-set.

According to an embodiment of the present disclosure, additionally or alternatively, the monitoring module 201 is further configured to monitor whether the number of accesses to a storage node in a unit time reaches a predetermined I/O upper limit of the storage node; and wherein, the storage node sub-set adjusting module 204 is further configured to, in response to monitoring that the number of accesses to a storage node in the unit time reaches the predetermined I/O upper limit, adjust the storage node sub-sets of the respective users with user data on the storage node. The predetermined I/O upper limit may be set by the apparatus by default or be pre-specified by a user of the apparatus of the present disclosure, for defining the maximum number of accesses that may be accepted in a unit time by a storage node of the distributed storage system. For example, it may specified that the I/O upper limit of a storage node is 10 thousands accesses per hour; so when the monitoring module 201 monitors that the number of accesses on a storage node reaches 10 thousands in an hour, the monitoring module 201 may send an adjustment request to the storage node sub-set adjusting module 204, to trigger the storage node sub-set adjusting module 204 to adjust the storage node sub-sets of all the users with user data on the storage node, for example, adding one or more storage nodes to the storage node sub-set of each of the users to expand the storage node sub-set thereof.

According to an embodiment of the present disclosure, the storage node sub-set adjusting module 204 includes an access numbers compatibility determining sub-module configured to determine whether the number of accesses in each unit time in the time period in the time-based access pattern of the user is compatible with the number of accesses in each unit time in the time period to the storage node by the respective users in the time-based access pattern of the storage node. The storage node sub-set adjusting module 204 also includes a candidate storage node determining sub-module configured to, in response to determining that the numbers of accesses are compatible, determine that the storage node is a candidate storage node that can be added to the storage node sub-set of the user.

According to a further embodiment of the present disclosure, the storage node sub-set adjusting module 204 is further configured to select a specific number of storage nodes from the candidate storage nodes determined that can be added to the storage node sub-set of the user as the storage nodes to be added to the storage node sub-set of the user. The specific number may be a fixed number or may be a predetermined proportion of the number of storage nodes in the storage node sub-set of the user. The predetermined proportion may be set by the apparatus of the present disclosure by default or specified by a user of the apparatus of the present disclosure. For example, if the predetermined proportion is 100%, each adjustment will double the storage node sub-sets of the user. In this way, the number of times of adjusting the storage node sub-set may be reduced, and the data movement amount brought by the adjustment of storage node sub-set may also be reduced.

According to a further embodiment of the present disclosure, the access numbers compatibility determining sub-module is configured to divide the number of accesses of the user in each unit time in the time period in the time-based access pattern of the user by the number of the storage nodes in the storage node sub-set of the user, to get an anticipated number of accesses to a single storage node in each unit time in the time period by the user. The access numbers compatibility determining sub-module is further configured to add the anticipated number of accesses to a single storage node in each unit time in the time period by the user with the number of accesses in the each unit time in the time period to the storage node by the respective users (e.g., the users with user data on the storage node) in the time-based access pattern of the storage node. And the access numbers compatibility determining sub-module is further configured to determine whether the sum of the anticipated number of accesses of the user and the number of accesses of the respective users in each unit time in the time period is lower than a predetermined I/O upper limit of the storage node. If it is lower than the predetermined I/O upper limit, indicating that the two are compatible, it can be determined that the storage node is a candidate storage node that can be added to the storage node sub-set of the user.

Figure 4:
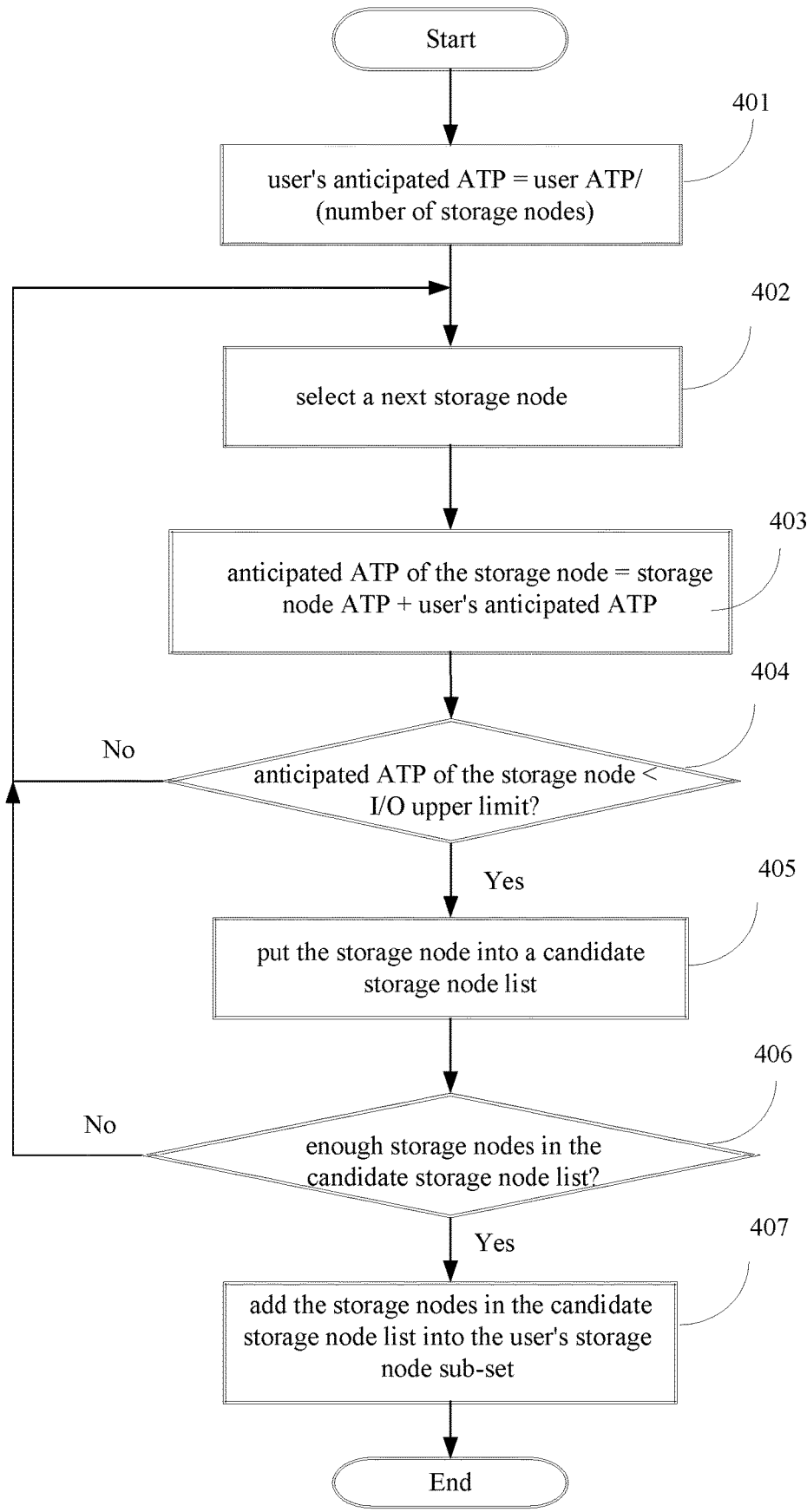
FIG. 4 shows a schematic flowchart of executing the storage node sub-set extension process by the storage node sub-set adjusting module according to an embodiment of the present disclosure.

FIG. 4 shows a schematic flowchart of executing the above storage node sub-set expansion process by the storage node sub-set adjusting module 204 according to an embodiment of the present disclosure.

As shown in FIG. 4, in step 401, an anticipated ATP of the user may be obtained by dividing the user ATP of the user by the number of the storage nodes in the storage node sub-set of the user, the anticipated ATP including an anticipated number of accesses to a single storage node in each unit time in the time period by the user.

In step 402, a next storage node may be selected. For example, a storage node may be selected arbitrarily from the remaining storage nodes other than the storage nodes in the storage node sub-set of the user in the distributed storage system.

In step 403, the storage node ATP of the storage node may be added with the user's anticipated ATP, to get an anticipated ATP of the storage node. That is to say, the number of accesses in each unit time in the storage node ATP may be added with the number of accesses in the corresponding unit time in the user's anticipated ATP, so as to get the anticipated ATP of the storage node.

In step 404, it may be determined whether the anticipated ATP of the storage node is lower than a predetermined I/O upper limit. That is to say, it may be determined whether the number in each unit time in the anticipated ATP is lower than the predetermined I/O upper limit. If no, the process returns to step 402 to select a next storage node. If yes, the process proceeds to step 405.

In step 405, in response to the anticipated ATP that is lower than the predetermined I/O upper limit, the storage node may be added to a candidate storage node list.

In step 406, it may be determined whether the candidate storage node list includes enough storage nodes. That is to say, it may be determined whether the number of storage nodes included in the candidate storage node list reaches the specific number, e.g., a predetermined proportion, as described. If no, the process returns to step 402 to select another storage node. If yes, the process proceeds to step 407.

In step 407, the storage nodes in the candidate storage node list may be added into the storage node sub-set of the user. Specifically, the list of these storage nodes may be added to the user profile of the user, and the storage nodes may be added to the storage node sub-set of the user by using an existing mechanism in the distributed storage system.

As further improvement to the apparatus of the present disclosure, the monitoring module 201 may be further configured to monitor whether the amount of user data stored in the storage node reaches a predetermined effectiveness threshold. Additionally, the access numbers compatibility determining sub-module may be further configured to (in response to determining that the amount of user data stored in the storage node has not reached the predetermined effectiveness threshold) use the anticipated number of accesses to a single storage node in each unit time by the respective users of the storage nodes as the numbers of accesses to the storage node in each unit time by the respective users. Such an improvement may relate to the situation where a new storage node has just been added to the distributed storage system, little user data is stored in the storage node, and correspondingly, the number of accesses to the storage nodes by users is also small. In such a situation the storage node ATP of the storage node may not truly reflect the potential number of accesses of the respective users, and thus the access numbers compatibility determining sub-module may not simply add the anticipated ATP of the user with the ATP of the storage node to determine whether the sum is lower than the predetermined I/O upper limit. Instead, in this situation it may first use the sum of the anticipated ATPs of the respective users on the storage nodes as the ATP of the storage node in place of the actual ATP of the storage node, and then add it with the user's ATP to determine whether the sum is lower than the predetermined I/O upper limit, in order to determine whether the storage node is a candidate storage node that can be added to the user's storage node sub-set. The predetermined effectiveness threshold may be designated as a fixed value or a proportion of storage space of the storage node, e.g., 1 G or 10%. By using the effectiveness threshold, the storage node ATP may become more precise, so as to improve the performance of the apparatus of the present disclosure.

Above is described an apparatus for time-based data placement in a distributed storage system according to embodiments of the present disclosure by referring to the accompanying drawings. It should be noted that the above description is merely exemplary, rather than restriction to the present disclosure. In other embodiments of the present disclosure, the system may have more, less or different modules, and the relationships of connection, inclusion and function etc. among the modules may be different from that is described an illustrated.

Figure 5:
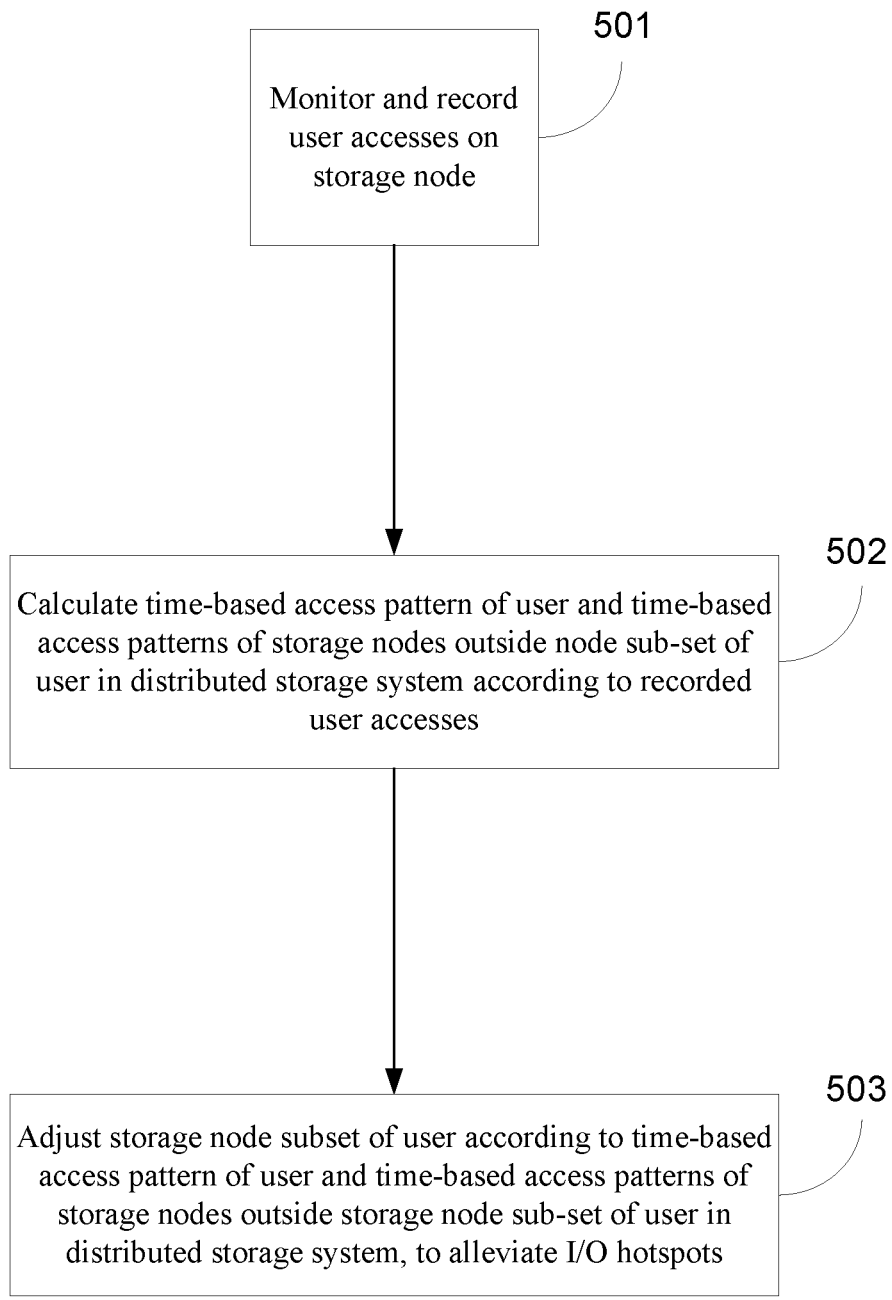
FIG. 5 shows a method for time-based data placement in a distributed storage system according to an embodiment of the present disclosure.

Now referring to FIG. 5, it shows a method for time-based data placement in a distributed storage system according to an embodiment of the present disclosure, the distributed storage system comprising a plurality of storage nodes for storing user data, and each user in at least one user is assigned a storage node sub-set for storing user data thereof. As shown in FIG. 5, the method comprises the following steps.

In step 501, monitoring and recording user accesses on the storage node.

In step 502, calculating a time-based access pattern of a user and time-based access patterns of the storage nodes outside the storage node sub-set of the user in the distributed storage system according to recorded user access.

In step 503, adjusting the storage node subset of the user according to the time-based access pattern of the user and the time-based access patterns of the storage nodes outside the storage node sub-set of the user in the distributed storage system, to alleviate I/O hotspots.

According an embodiment of the present disclosure, the calculating the time-based access pattern of a user includes adding the number of accesses in each unit time in a time period by the user to the respective storage nodes in the storage node sub-set, so as to get the time-based access pattern of the user. Also, calculating time-based access patterns of the storage nodes outside the storage node sub-set of the user in the distributed storage system includes adding the number of accesses in each unit time in a time period to a storage node by the respective users in the at least one user, so as to get the time-based access pattern of the storage node.

According to an embodiment of the present disclosure, the adjusting the storage node sub-set of the user according to the time-based access pattern of the user and the time-based access patterns of the storage nodes outside the storage node sub-set of the user in the distributed storage system includes determining whether the number of accesses of the user in each unit time in the time period in the time-based access pattern of the user is compatible with the number of accesses in each unit time in the time period to the storage nodes by the respective users in the time-based access pattern of the storage node, and further includes, in response to determining that the numbers of accesses are compatible, determining that the storage node is a candidate storage node that can be added to the storage node sub-set of the user.

According to an embodiment of the present disclosure, the determining whether the numbers of accesses are compatible includes dividing the number of accesses of the user in each unit time in the time period in the time-based access pattern of the user by the number of storage nodes in the storage node sub-set of the user, to get an anticipated number of accesses to a single storage node in the each unit time in the time period by the user; further includes adding the anticipated number of accesses to a single storage node in each unit time in the time period by the user with the number of accesses in the each unit time in the time period to the storage node by the respective users in the time-based access pattern of the storage node; and further yet includes determining whether the sum of the anticipated number of accesses of the user and the number of accesses of the respective users in each unit time in the time period is lower than a predetermined I/O upper limit of the storage node.

According to an embodiment of the present disclosure, the method further includes monitoring whether the amount of user data stored in the storage node reaches a predetermined effectiveness threshold. Also according to an embodiment, the determining whether the numbers of accesses are compatible includes, in response to monitoring that the amount of user data stored in the storage node has not reached the predetermined effectiveness threshold, using the anticipated number of accesses to a single storage node in each unit time by the respective users of the storage node as the numbers of accesses to the storage node in each unit time by the respective users.

According to an embodiment of the present disclosure, the adjusting the storage node sub-set of the user according to the time-based access pattern of the user and the time-based access patterns of the storage nodes outside the storage node sub-set of the user in the distributed storage system further includes selecting a specific number of storage nodes from the candidate storage nodes determined that can be added to the storage node sub-set of the user as the storage nodes that can be added to the storage node sub-set of the user. In an embodiment, the specific number is a predetermined proportion of the number of the storage nodes in the storage node sub-set of the user.

According to an embodiment of the present disclosure, the method further includes monitoring whether the user data of users on a storage node reaches a predetermined user usage amount threshold. Also, in an embodiment, the adjusting the storage node sub-set of the user includes, in response to monitoring that the user data of a user on the storage node reaches the predetermined user usage threshold, adjusting the storage node sub-set of the user.

According to an embodiment of the present disclosure, the method further includes monitoring whether the number of accesses to a storage node in a unit time reaches a predetermined I/O upper limit of the storage node. Also, in an embodiment, the adjusting the storage node sub-set of the user includes, in response to monitoring that the number of accesses to the storage node in a unit time reaches the predetermined I/O upper limit of the storage node, adjusting the storage node sub-sets of the respective users having user data on the storage node.

Above is described a method for time-based data placement in a distributed storage system according to embodiments of the present disclosure. It should be noted out that the above description is merely exemplary, rather than restriction to the present disclosure. In other embodiments of the present disclosure, the method may have more, less or different steps, and the relationship of sequence, inclusion and functions etc. among the steps may be different from that is described or illustrated.

The solutions of the present disclosure, according to embodiments, may keep the user data suitably aggregated by assigning storage node sub-sets for different users in the distributed storage system. Meanwhile, by monitoring and recording the access to the respective storage nodes by the users, and creating and using the user ATP which reflects the number of accesses to the respective storage nodes in each unit time in a specific time period by each user, and the storage node ATP reflecting the number of accesses in each unit time by the respective users on each storage node, the suitable storage nodes may be added to the storage node sub-set of the user, so as to avoid the possible occurrence of I/O hotspot. In addition, according to the embodiments of the present disclosure, monitoring modules 201 are installed on each storage node of the distributed storage system; user access pattern calculating module 202, storage node access pattern calculating module 203 and storage node sub-set adjusting module 204 are installed on the proxy nodes or management nodes; the storage node sub-sets for users are created and adjusted by the existing mechanism of the distributed storage system; and the capacity footprint of ATP unit is small, user ATP and storage node ATP are also small, and the I/O footprint of the monitoring module is also small. Therefore, the apparatus and method according to the embodiments of the present disclosure have little influence and modification on the distributed storage system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. As used herein, a computer readable storage medium is not a transitory signal per se.

Figure 6:
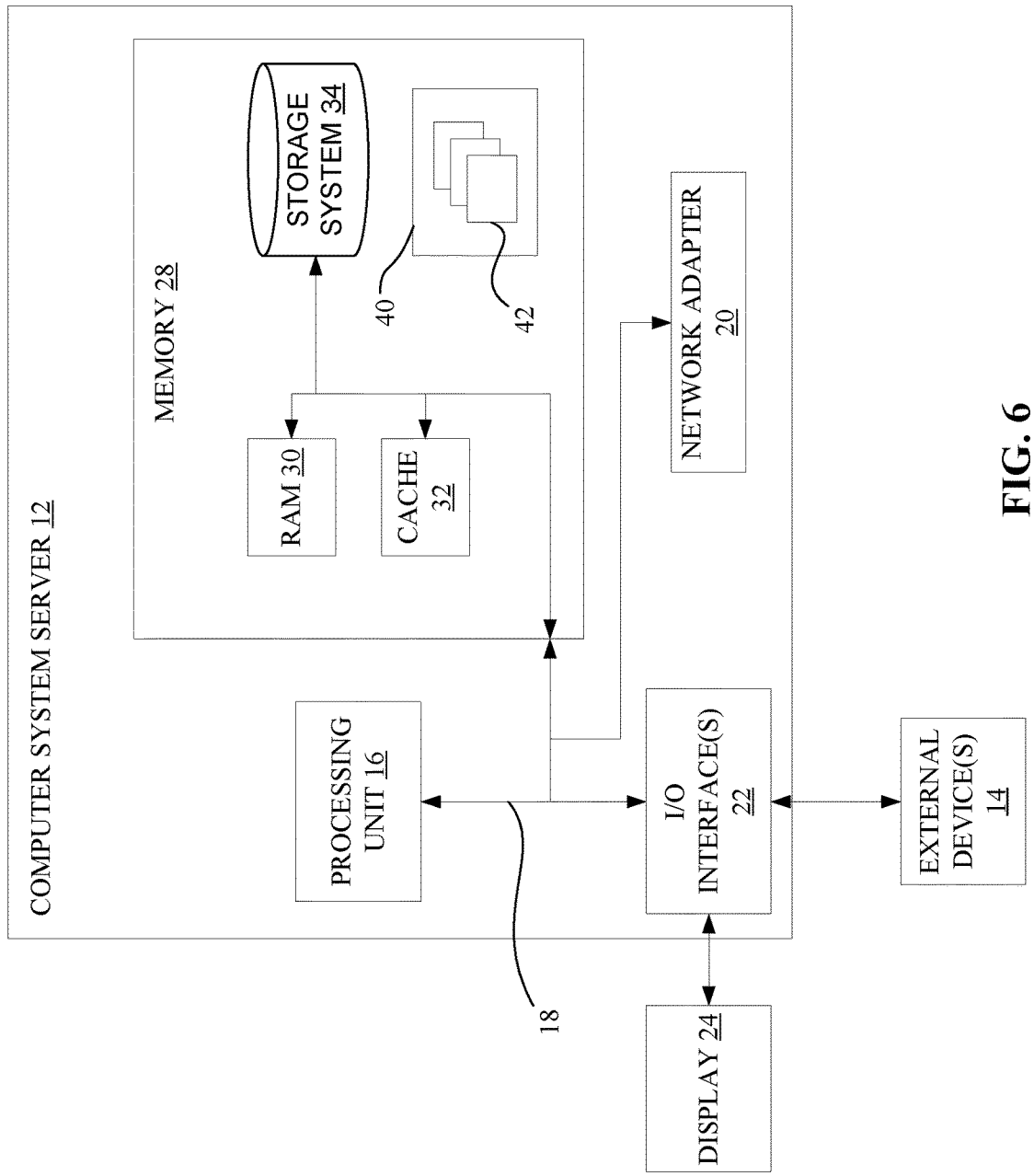
FIG. 6 shows an exemplary computer system 100 which is applicable to implement the embodiments of the present disclosure.

Referring now to FIG. 6, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 6, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for time-based data placement in a distributed storage system, wherein the distributed storage system includes a plurality of identical storage nodes for storing user data, and wherein each of at least one user is assigned a storage node sub-set for storing user data, the method comprising:
    monitoring, by the distributed storage system and recording, user accesses on the identical storage nodes, wherein each of the identical storage nodes of the distributed storage systems includes the same hardware configuration as the other identical storage nodes of the distributed storage systems, wherein the storage devices of each identical storage node have similar input-output characteristics as storage devices of the other identical storage nodes of the distributed storage system, wherein the monitoring is based on recording information in a three-dimensional time-based array that includes a set of three elements, and wherein each element of the set records a number of user accesses in a corresponding hour;
    calculating, by the distributed storage system based on the recorded user accesses of a first user, a time-based access pattern of the first user,
    wherein the calculating the time-based access patterns of the first user may be performed by a first proxy node separate from the identical storage nodes that comprise the distributed storage system;
    calculating, by the distributed storage system based on the recorded user accesses, time-based access patterns of the identical storage nodes outside a storage node sub-set of the first user in the distributed storage system,
    wherein the calculating the time-based access patterns of the identical storage nodes outside the storage node sub-set of the first user may be performed by corresponding modules that are a part of the identical storage nodes that comprise the distributed storage system, and wherein each corresponding module may be configured to form a storage node profile of the corresponding storage node together with the list of all the users having data on the corresponding storage node; and
    adjusting, by the distributed storage system based on the time-based access pattern of the first user and the time-based access patterns of the identical storage nodes outside of the storage node sub-set of the first user in the distributed storage system, the storage node sub-set of the first user to alleviate I/O hotspots,
    wherein the I/O hotspots are determined based on predetermined I/O upper limits for identifying candidate storage nodes,
    wherein adjusting the storage node sub-set of the first user by the distributed storage system to alleviate I/O hotspots comprises adding at least one new storage node to the storage node sub-set of the first user,
    wherein adjusting the storage node sub-set of the first user by the distributed storage system to alleviate I/O hotspots comprises doubling the storage nodes of the storage node sub-set of the first user to reduce future storage node sub-set adjustments.

2. The method of claim 1, wherein the calculating a time-based access pattern of a first user includes adding nodes outside the storage node sub-set of the first user in the distributed storage system includes adding the numbers of accesses in each unit time in a time period to a storage node by the respective users in the at least one user, so as to get a time-based access pattern of the storage node.

3. The method of claim 2, wherein the adjusting the storage node sub-set of the first user according to the time-based access pattern of the first user and the time-based access patterns of the storage nodes outside the storage node sub-set of the first user in the distributed storage system comprises:
    determining whether the number of accesses of the first user in each unit time in the time period in the time-based access pattern of the first user is compatible with the number of accesses in each unit time in the time period to the storage node by the respective users in the time-based access pattern of the storage node; and
    in response to determining that the numbers of accesses are compatible, determining that the storage node is a candidate storage node that can be added to the storage node sub-set of the first user.

4. The method of claim 3, wherein the determining whether the numbers of accesses are compatible comprises:
    dividing the number of accesses of the first user in each unit time in the time period in the time-based access pattern of the first user by the number of the storage nodes in the storage node sub-set of the first user, to get an anticipated number of accesses to a single storage node in the each unit time in the time period by the first user;
    adding the anticipated number of accesses to a single storage node in each unit time in the time period by the first user with the number of accesses in the each unit time in the time period to the storage node by the respective users in the time-based access pattern of the storage node;
determining whether the sum of the anticipated number of accesses of the first user and the number of accesses of the respective users in each unit time in the time period is lower than a predetermined I/O upper limit of the storage node.

5. The method of claim 3, further comprising:
monitoring whether the amount of user data stored in the storage node reaches a predetermined effectiveness threshold;
and wherein, the determining whether the numbers of accesses are compatible comprises: in response to determining that the amount of user data stored in the storage node has not reached the predetermined effectiveness threshold, using the anticipated numbers of accesses to a single storage node in each unit time by the respective users of the storage node as the numbers of accesses to the storage node in each unit time by the respective users.

6. The method of claim 3, wherein the adjusting the storage node sub-set of the first user according to the time-based access pattern of the first user and the time-based access patterns of the storage nodes outside the storage node sub-set of the first user in the distributed storage system further comprises:
selecting a specific number of storage nodes from the candidate storage nodes determined that can be added to the storage node sub-set of the first user as the storage nodes to be added to the storage node sub-set of the first user, the specific number being a predetermined proportion of the number of the storage nodes in the storage node sub-set of the first user.

7. The method of claim 1, further comprising:
monitoring whether the user data of users on a storage node reaches a predetermined user usage threshold;
and wherein, the adjusting the storage node sub-set of the first user comprises: in response to determining that the user data of the first user on the storage node reaches the predetermined user usage threshold, adjusting the storage node sub-set of the first user.

8. The method of claim 1, further comprising:
monitoring whether the number of accesses to a storage node in a unit time reaches a predetermined I/O upper limit of the storage node;
and wherein the adjusting the storage node sub-set of the first user comprises: in response to determining that the number of accesses to the storage node in a unit time reaches the predetermined I/O upper limit of the storage node, adjusting the storage node sub-sets of the respective users having user data on the storage node.

9. An apparatus for time-based data placement in a distributed storage system, wherein the distributed storage system comprising a plurality of storage nodes for storing user data, and wherein each of at least one user is assigned a storage node sub-set for storing user data of the at least one user, the apparatus comprising:
a memory, the memory containing computer readable instructions; and
a processor, the processor communicatively coupled to the memory, the processor in response to reading the computer readable instructions configured to:
monitor and record user accesses on the storage nodes, wherein each storage node includes an identical configuration of storage devices, and
wherein the monitoring is based on recording information in a three-dimensional time-based array that includes a set of three elements, and wherein each element of the set records a number of user accesses in a corresponding hour;
calculate a time-based access pattern of a first user according to recorded user accesses of the first user, wherein the calculating the time-based access patter of the first user may be performed by a first proxy node separate from the storage nodes that comprise the distributed storage system;
calculate time-based access patterns of the storage nodes outside the storage node sub-set of the first user in the distributed storage system according to recorded user accesses of the first user,
wherein the calculating the time-based access patterns of the storage nodes outside the storage node sub-set of the first user may be performed by corresponding modules that are a part of the identical storage nodes that comprise the distributed storage system, and wherein each corresponding module may be configured to form a storage node profile of the corresponding storage node together with the list of all the users having data on the corresponding storage node; and
adjust the storage node sub-set of the first user according to the time-based access pattern of the first user and the time-based access patterns of the storage nodes outside the storage node sub-set of the first user in the distributed storage system, to alleviate I/O hotspots,
wherein each of the plurality of storage nodes includes hardware having similar input-output performance characteristics to the other storage nodes of the plurality,
wherein the I/O hotspots are determined based on predetermined I/O upper limits for identifying candidate storage nodes,
wherein adjusting the storage node sub-set of the first user by the distributed storage system to alleviate I/O hotspots comprises adding, based on the time-based access pattern of the first user and the time-based access patterns of the storage nodes outside the storage node sub-set of the first user, at least one new storage node to the storage node sub-set of the first user, and adding at least one new storage node to the storage node sub-set for each user having data on the storage node to reduce future storage node sub-set adjustments.

10. The apparatus of claim 9, wherein the apparatus is further configured to add the numbers of accesses in each unit time in a time period by the first user to the respective storage nodes in the storage node sub-set of the first user, so as to get a time-based access pattern of the first user; and
wherein the apparatus is further configured to add the numbers of accesses in each unit time in a time period to a storage node by the respective users in the at least one user, so as to get a time-based access pattern of the storage node.

11. The apparatus of claim 10, wherein the processor is further configured to:
determine whether the number of accesses in each unit time in the time period in the time-based access pattern of the first user is compatible with the number of accesses in each unit time in the time period to the storage node by the respective users in the time-based access pattern of the storage node; and
in response to determining that the numbers of accesses are compatible, determine that the storage node is a candidate storage node that can be added to the storage node sub-set of the first user.

12. The apparatus of claim 11, wherein the processor is further configured to:
divide the number of accesses of the first user in each unit time in the time period in the time-based access pattern of the first user by the number of the storage nodes in the storage node sub-set of the first user, to get an anticipated number of accesses to a single storage node in each unit time in the time period by the first user;
add the anticipated number of accesses to a single storage node in each unit time in the time period by the first user with the number of accesses in the each unit time in the time period to the storage node by the respective users in the time-based access pattern of the storage node; and
determine whether the sum of the anticipated number of accesses of the first user and the number of accesses of the respective users in each unit time in the time period is lower than a predetermined I/O upper limit of the storage node.

13. The apparatus of claim 11, wherein the processor is further configured to monitor whether the amount of user data stored in the storage node reaches a predetermined effectiveness threshold; and wherein the processor is further configured to, in response to determining that the amount of user data stored in the storage node has not reached the predetermined effectiveness threshold, use the anticipated numbers of accesses to a single storage node in each unit time by the respective users of the storage node as the numbers of accesses to the storage node in each unit time by the respective users.

14. The apparatus of claim 11, wherein the processor is further configured to:
select a specific number of storage nodes from the candidate storage nodes determined that can be added to the storage node sub-set of the first user as the storage nodes to be added to the storage node sub-set of the first user, the specific number being a predetermined proportion of the number of the storage nodes in the storage node sub-set of the first user.

15. The apparatus of claim 9, wherein the processor is further configured to monitor whether the user data of users on a storage node reaches a predetermined user usage threshold; and wherein, the processor is configured to, in response to determining that the user data of the first user on the storage node reaches the predetermined user usage threshold, adjust the storage node sub-set of the first user.

16. The apparatus of claim 9, wherein the processor is further configured to monitor whether the number of accesses to a storage node in a unit time reaches a predetermined I/O upper limit of the storage node; and wherein the processor is further configured to, in response to determining that the number of accesses to the storage node in a unit time reaches the predetermined I/O upper limit of the storage nodes, adjust the storage node sub-sets of the respective users having user data on the storage node.

17. A computer program product for time-based data placement in a distributed storage system, wherein the distributed storage system includes a plurality of storage nodes for storing user data, and wherein each of a plurality of users is assigned a storage node sub-set for storing user data, the computer program product comprising a non-transitory computer readable storage medium having program instructions embodied therewith, the program instructions configured, when executed by a computer, to cause the computer to perform a method comprising:
monitoring and recording user accesses on the storage nodes, wherein each of the storage nodes of the distributed storage systems includes hardware having similar input-output performance, wherein each storage node includes an identical configuration of storage devices, and
wherein the monitoring is based on recording information in a three-dimensional time-based array that includes a set of three elements, and wherein each element of the set records a number of user accesses in a corresponding hour;
calculating, based on the recorded user accesses of a first user, a time-based access pattern of the first user,
wherein the calculating the time-based access patter of the first user may be performed by a first proxy node separate from the storage nodes that comprise the distributed storage system;
calculating, based on the recorded user accesses, time-based access patterns of the storage nodes outside a storage node sub-set of the first user in the distributed storage system,
wherein the calculating the time-based access patterns of the storage nodes outside the storage node sub-set of the first user may be performed by corresponding modules that are a part of the identical storage nodes that comprise the distributed storage system, and wherein each corresponding module may be configured to form a storage node profile of the corresponding storage node together with the list of all the users having data on the corresponding storage node;
adding, by the distributed storage system to alleviate I/O hotspots and based on the time-based access pattern of the first user and the time-based access patterns of the storage nodes outside of the storage node sub-set of the first user in the distributed storage system, at least one new storage node to the storage node sub-set of the first user, to alleviate I/O hotspots, wherein the I/O hotspots are determined based on predetermined I/O upper limits for identifying candidate storage nodes; and
adding, by the distributed storage system to alleviate potential I/O hotspots, at least one new storage node to the storage node sub-set for each user other than the first user having data on the storage node.

18. The computer program product of claim 17, wherein the at least one new storage node added to the storage node sub-set of the first user comprises a non-volatile computer system storage medium.

19. The method of claim 1, wherein the at least one new storage node added to the storage node sub-set of the first user comprises a non-volatile computer system storage medium.

20. The apparatus of claim 9, wherein the at least one new storage node added to the storage node sub-set of the first user comprises a non-volatile computer system storage medium.

* * * * *